MAGNETO-ACOUSTIC TRANSDUCER FOR HIGH TRACK DENSITY RECORDING

Filed Jan. 9, 1967

2 Sheets-Sheet 1

INVENTORS
DENNIS E. SPELIOTIS
JOHN R. MORRISON
JOHN S. JUDGE
BY
Sughrue, Rothwell, Mion, Zinn & Macpeak
ATTORNEY United States Patent Office 3,526,899

Patented Sept. 1, 1970

3,526,899

MAGNETO-ACOUSTIC TRANSDUCER FOR HIGH TRACK DENSITY RECORDING

Dennis E. Speliotis and John R. Morrison, Boulder, Colo., and John S. Judge, Syracuse, N.Y., assignors to International Business Machines Corporation, Armonk, N.Y., a corporation of New York Filed Jan. 9, 1967, Ser. No. 607,967
Int. Cl. G11b 5/44, 5/00
U.S. Cl. 346—74 3 Claims

ABSTRACT OF THE DISCLOSURE

A magnetic write head in combination with a stress wave transducer for recording data on a magnetic medium in response to the coincidence of a stress wave and a current pulse. The stress wave transducer creates a traveling stress wave in the write head and narrows the hysteresis loop of the write head. The current pulse causes magnetic switching of the stressed portion of the write head. The position of the recorded pulse is determined by the position of the stress wave when the current pulse is applied.

The invention is in the field of methods and apparatus for recording information on a magnetic medium.

The writing of information with high area density on drums, discs or tapes requires that many tracks of information be written on a given width of material. In order to increase the density of information which is recorded on a magnetic medium, it is necessary to increase the number of tracks of information in a direction perpendicular to the motion of the recorded medium. One method is to use very small magnetic write heads having extremely small recording and reading gaps, and using each head for a different track of information. As the desired density increases, the size of the write heads must decrease. The smaller the write heads, the more difficult they are to manufacture and the cost becomes prohibitive.

Another method for increasing the number of tracks in a given width of recording medium is to use a small head containing only a few read and write gaps and mechanically accessing the head across the medium to cover all desired tracks. That scheme is acceptable when the track width desired is of the order of tens of mils. However, the necessity to repeatedly mechanically access such a head with precision of the order of a mil or better is difficult to fulfill.

The magneto-acoustic recorder described herein achieves high track density recording in a manner different from the two schemes described above. The invention makes use of the phenomena that occurs when materials useful as magnetic read-write heads are subject to a stress wave. A stress wave causes the hysteresis loop of such materials to be significantly narrowed so that a given amplitude of magnetic flux is created by a lower amplitude current pulse. Stated another way, for a given amplitude current pulse, a magnetic transducer which is under stress will produce a greater amplitude of flux than a magnetic transducer which is not under stress. The latter principle is used to record digital information on a magnetic medium.

The magnetic transducer, having a gap which extends over many tracks along the width of the magnetic medium, is bonded at one end to an ultrasonic transducer, sometimes referred to as a stress wave transducer. A current carrying coil is wound around the magnetic transducer in a manner well known in the art for the purpose of producing flux changes in the air gap of the transducer. In operation, an ultrasonic pulse generator pulses the acoustic transducer which causes a stress wave to begin traveling down the length of the magnetic transducer. As the stress wave moves down the magnetic transducer, the hysteresis loop is significantly narrowed in localized area, each local area corresponding to a separate track on the recording medium. In order to write a data bit in any desired track, the current carrying coil is pulsed at the time that the stress wave is at a point in the magnetic transducer above the desired track.

It is not necessary that only a single transducer be used for the entire width of a magnetic recording medium. Instead, two or more transducers of the type described herein may be used, the principle being the same.

A better understanding of the invention may be had by referring to the drawings and the detailed description which appears below, wherein.

Figure 1:
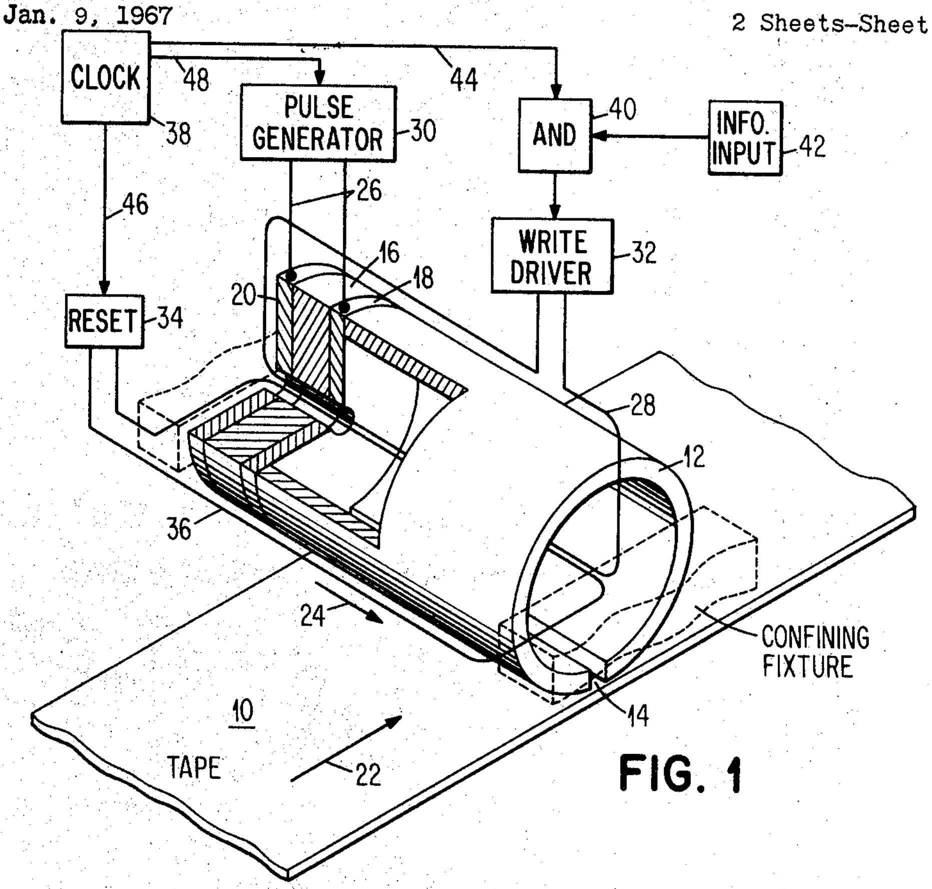
FIG. 1 is a preferred embodiment of the invention.

The apparatus of FIG. 1 includes a recording head 12 in combination with an ultrasonic transducer 16. Electrode plates 20 and 18 are bonded to opposite sides of transducer 16, and head 12 is bonded to the other side of electrode plate 18.

The material from which the magnetic head is constructed may have either positive or negative magnetostrictive properties. By this is meant that the material may either undergo a compressive stress or a tension stress when magnetized. The ultrasonic transducer 16 selected for use with the given material must have the same "magnetostrictive polarity" as the material. That is to say, if a positive magnetostrictive material is used, the transducer must be one which will create a positive stress wave, and vice versa. One example of a material having positive magnetostrictive characteristics and which may be used as the magnetic head 12, is Permalloy 68. The latter could be used in combination with a barium titanate ultrasonic transducer or a quartz crystal ultrasonic transducer, both of which have positive magnetostrictive characteristics. Nickel may also be used for the magnetic head. Although a few materials are described above, it will be noted by those having ordinary skill in the art that there are many materials having the characteristics of the magnetic head and the ultrasonic transducer which are described herein, and they may also be used in the invention.

The particular apparatus shown in FIG. 1 for initiating the current pulses and the ultrasonic pulses is shown only by way of example and it will be apparent to those having ordinary skill in the art that many different arrangements of electronic circuitry may be used for generating the desired pulses in accordance with the teachings below.

The digital information to be recorded is indicated as being applied from input unit 42 through AND gate 40 to the write driver 32. AND gate 40 is controlled by clock pulses from clock 38 which are applied on lead 44. The write driver 32 applies data pulses to the transducer coil which is indicated generally at 28. Note that holes are provided in transducer 16 and plates 18 and 20 for accommodating the transducer coil 28. Although coil 28 is illustrated as having only a single turn, it will be apparent to those having ordinary skill in the art that the coil may have a plurality of turns. Clock 38 also provides initiating pulses on lead 48 for the purpose of initiating the ultrasonic pulse generator 30 which in turn pulses ultrasonic transducer 16 via leads 26. A reset generator 34, which is initiated by pulses from clock 38 on lead 46, and which energizes the reset coil 36 is used in some of the embodiments as will be described hereinafter.

The combined magneto-acoustic transducer is positioned across the width of a magnetic medium such as tape 10 which is travelling in a direction 22. The air gap 14 of magnetic head 12 lies above the magnetic recording medium by a small amount sufficient to allow magnetic recording as is well known in the art. The direction of recording across the width of the tape is the same as the direction of travel of the stress wave and is indicated by arrow 24. The magnetic head and ultrasonic transducer assembly must be confined in a fixture so that the proper stress wave is induced in the head rather than simply allowing the head to expand.

Generally, the device shown in FIG. 1 operates as follows: Tape 10 is moving in the direction indicated by arrow 22, and may be moving continuously or intermittently. It is to be noted that if the tape is moved continuously, the bits recorded in the several tracks by the application of a single ultrasonic stress wave will be slightly skewed. Clock 38 provides pulses on lead 48 which initiate ultrasonic pulse generator 30 and the ultrasonic transducer 16 causing a stress wave to begin travelling down the magnetic head in the direction indicated by arrow 24. The stress wave takes a finite time to travel the length of the head and during that time the input data is applied to the write driver 32 via AND gate 40. The AND gate 40 is controlled by clock pulses on 44 which represent in time the tracks on the width of the tape. The number of clock pulses appearing on lead 44 in between the initiating pulses on lead 48 is equal to the number of tracks across the width of tape 10. Each time the write driver receives an input, it applies a current pulse on coil 28 which is sufficient to increase the flux in the air gap to a write level only in the locality of the head which is under stress. Consequently, the bit of information is recorded in the proper track on tape 10.

In general, the recording medium may be normally unmagnetized or may be normally magnetized in a direction which is opposite to the direction of magnetization for a recorded bit of information. Also, the magnetic head may have either a square loop hysteresis characteristic or a non-square loop hysteresis characteristic. In the former case, a reset pulse is necessary to revert the magnetic head back to a non-recording state of magnetization.

Figure 2:
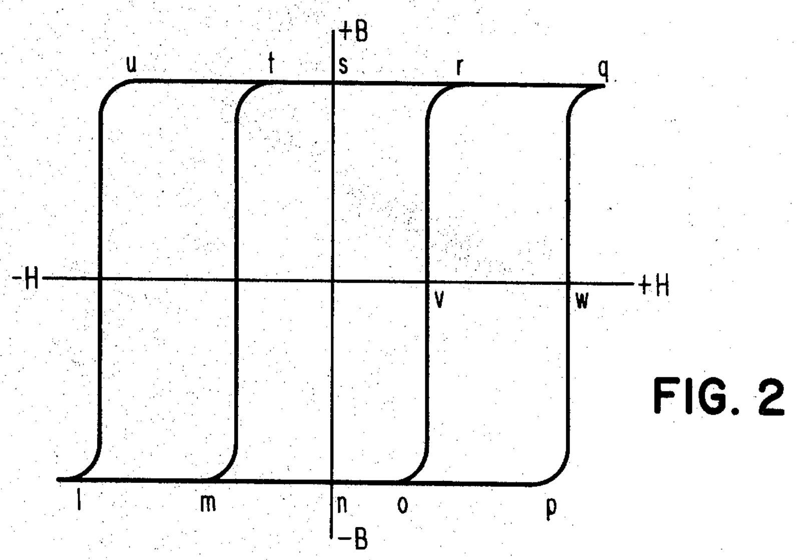
FIG. 2 is a graph showing the effect of a stress wave on a magnetostrictive material having a square wave hysteresis loop.

An example of the hysteresis characteristic of a square loop magnetic head is shown in FIG. 2 wherein curve *l*, *n*, *p*, *w*, *q*, *s*, *u* represents the normal hysteresis characteristic of the magnetic material. Assuming that the material is in a negative state of magnetic remanence, i.e., point *n* on the hysteresis characteristic, it can be seen that the current required to cause a switching of polarity must be great enough to pass the knee of the hysteresis characteristic indicated at *p*. However, if the current is only great enough to create an H field which lies somewhere between points *v* and *w*, it is apparent that the material will remain in its negative magnetic remanence state.

When a stress wave is applied to the material it exhibits a hysteresis characteristic which is shown by curve *m*, *n*, *o*, *v*, *r*, *s*, *t*. It is apparent that a current sufficient to increase the H field somewhere between *v* and *w* is also sufficient to cause a switching of polarity of the magnetic field of the stressed material. Consequently, if the recording medium is either unmagnetized or magnetized in the negative direction, the coincidence of a current pulse having the strength described above and a stress wave will cause the recording of a bit of information on the magnetic medium. In order to revert the entire magnetic head back to its original state of remanence, it is only necessary to apply a negative polarity current pulse to a coil which is wound around the magnetic head. The reset pulse must have sufficient magnitude to cause a traversal of the hysteresis loop past the knee *u*. To avoid partially erasing any information that may be on the medium of the vicinity of the gap 14 during reset, the reset pulse should be a low amplitude, longer duration pulse which will switch the head 12 slowly back to its reset condition.

Figure 3:
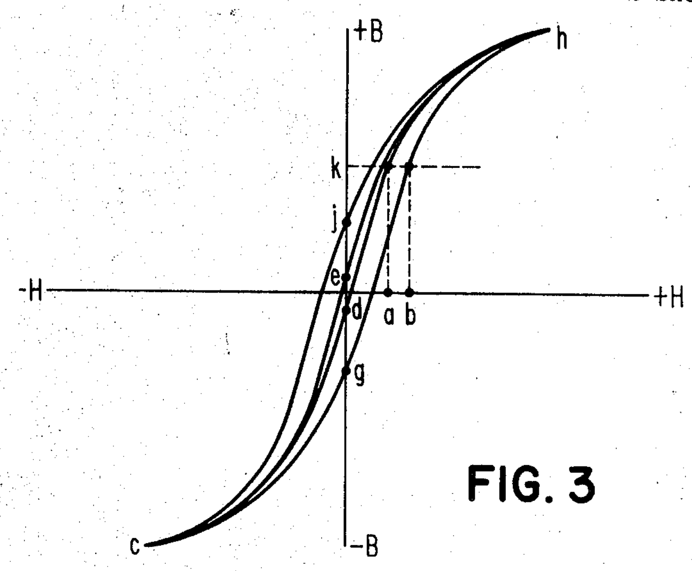
FIG. 3 is a graph showing the effect of a stress wave on a magnetostrictive material having a non-square wave hysteresis loop.

FIG. 3 shows the hysteresis characteristic of a non-square wave hysteresis loop material. The curve *c*, *g*, *h*, *j* represents the magnetic characteristic when the material is not under stress, and the curve *c*, *d*, *h*, *e* represents the magnetic characteristic of the material when it is under stress. It is apparent from the two curves that the material does not have a large remanent state of polarization and therefore no reset pulse is necessary. As indicated in FIG. 3, the flux level *k* must be exceeded in order to record a bit of information on the magnetic medium. Thus, in order to provide recording only when the material is under stress, the current should be sufficient to cause an H field somewhere between *a* and *b* as indicated on the graph. If the material is unstressed, the magnetization of the head will follow curve *g*, *h* and will not reach the intensity sufficient to write on the medium. However, if the material is under stress, the magnetization will follow curve *d*, *h*, and the flux level will be greater than the level *k*. A material having the characteristics shown in FIG. 3 may be used with a recording medium that is normally unmagnetized or with one which is normally magnetized in the direction opposite to the direction of recording. In either case no reset is necessary since the fields applied to the material in its unstressed condition are not sufficient to magnetize it significantly and after each energization the head will revert to a condition of near zero remanence. When the stressed condition, the material exhibits even less remanence so again, it will return essentially to a demagnetized state.

In the case of either square wave or non-square wave hysteresis loop materials, the switching speed may be improved by providing a D.C. bias current to the transducer coil. It will be apparent to those having ordinary skill in the art that either the pulsed coil or a separate coil may be used for the bias. The magnitude of the bias is such as to place the H field at a point just before the knee of the stressed hyseresis loop in the case where a material having characteristics of FIG. 2 is used, or just before point *a* in the case where material having characteristics of FIG. 3 is used. Thus, when the material is stressed and a current pulse is applied the material reaches the knee of the loop or the critical field much sooner than would otherwise be the case. In FIG. 2, the bias would place the H field slightly before *v*, and in FIG. 3, the bias would place the H field slightly before *a*.

Figure 4:
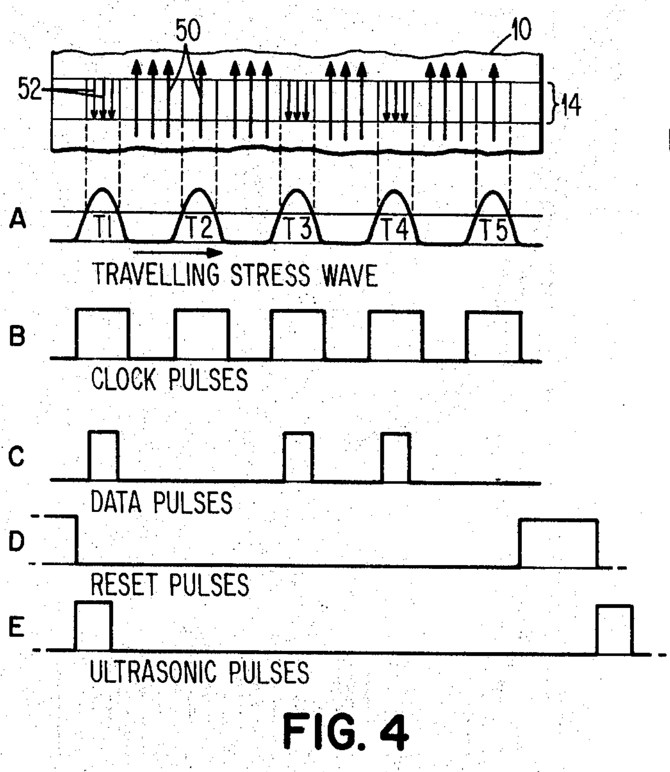
FIG. 4 is a waveform diagram illustrating the sequence of stress wave and current pulses when single polarity current pulses are used.

The graph shown in FIG. 4 illustrates the time coincidence of the stress wave and the current pulses. At the top of FIG. 4 there is illustrated a small segment of the width of recording medium 10 which is directly underneath the gap 14 of magnetic head 12. For the first case, it is asumed that the medium is normally magnetized in the negative direction and this is indicated by arrows 50. Small arrows 52 indicate the recording of a bit of information in the desired track. In the diagram, it is assumed for the purpose of explanation only that there are five tracks per width of the recording medium.

Curve A represents the stress wave which travels along the magnetic head in the direction shown by the arrow. At time 1, the stress wave is above track 1, at time 2 it is above track 2, etc. Waveform B represents the clock pulses which control the application of the information to be recorded on the recording medium, and waveform C represents the data to be recorded. In the recording system shown, one bits are recorded and zero bits are not recorded at all. At time T1, a one-bit is applied to the transducer coil in coincidence with the stress wave being spatially over track 1. The portion of the magnetic head which is under stress has a narrow hysteresis loop and thereby creates a sufficient flux in the positive direction to record a one-bit on the magnetic medium in track 1. At time 2, there is no current pulse applied to the transducer coil and, therefore, there is no recording of information in track 2. At times T3 and T4, current pulses are applied to the transducer coil resulting in the recordation of bits of information in tracks 3 and 4 respectively. The output from the ultrasonic pulse generator which is applied to plates 20 and 18 of FIG. 1 to cause ultrasonic transducer 16 to create the stress wave, is indicated at waveform E in FIG. 4.

As stated above, in connection with materials having square wave hysteresis loops, it is necessary to reset the magnetic head. If the recording medium is normally magnetized in the direction which is opposite the direction of recording, it is necessary that those portions of the magnetic head which have been switched, be switched back to the original condition. This may be accomplished by applying a reset pulse, such as shown in waveform D to a reset generator 34 such as shown in FIG. 1. The reset generator 34 applies a current pulse on a lead 36 which is sufficient to revert the switched portions back to the negative state of magnetic remanence. It is to be noted that the terms negative and positive are relative and that they do not describe any one absolute state of magnetic remanence. For example, it may be said that arrows 50 in FIG. 4 represent a negative state of magnetic remanence and that arrows 52 represent a positive state of magnetic remanence. It is also permissible to say that arrows 50 represent a positive state of magnetic remanence and arrows 52 represent a negative state of magnetic remanence. The only important thing being that when the square loop material switches from one state to the other in recording a bit of information, it must be then switched back to the first state.

If the square loop hysteresis material is used in conjunction with a recording medium that is normally nonmagnetized, then it is necessary to revert the write head back to a state of zero remanence after the stress wave has traversed the entire width of the recording medium. The latter may not be accomplished by merely applying a reset current pulse to coil 36 of FIG. 1. Instead, it would be necessary to apply a decreasing amplitude A.C. pulse to the reset coil. The latter type pulse would revert the material from the state indicated by *s* in FIG. 2 back to zero.

The waveform shown in FIG. 4 also represents the recording of information by a magnetic head having the hysteresis characteristics shown in FIG. 3. However, in this case it is not necessary to provide a reset pulse due to the fact that after the data recording current pulse has been applied to the coil 28, the flux field in the air gap reverts back to substantially zero magnetic remanence as is indicated by the curves of FIG. 3. Also, it makes no difference whether the recording medium is normally unmagnetized or normally magnetized in a direction opposite to the recording direction.

Figure 5:
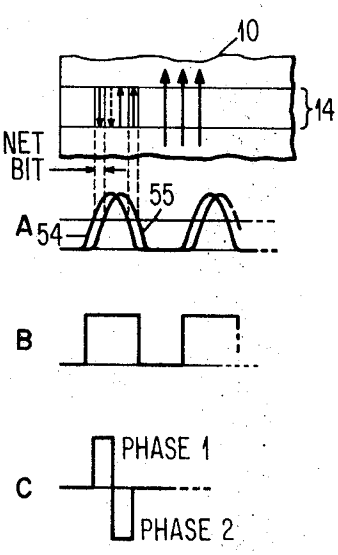
FIG. 5 is a waveform diagram illustrating the sequence of stress wave and current pulses when two-phase current pulses are used.

For the recording technique described above, the width of the bit written by the combined effects of magnetostriction and current is substantially the same as the width of the stress pulse which travels down the magnetic head. By using a slightly different technique, the same magnetic head and ultrasonic transducer arrangement can be made to record pulses having a substantially narrower width. This technique is illustrated generally in FIG. 5 and is accomplished by providing bipolar current pulses rather than single polarity current pulses such as those indicated in waveform C of FIG. 4. The bipolar current pulses are indicated in waveform C of FIG. 5. Waveforms A and B of FIG. 5 represent the stress wave and clock pulses respectively. Only a single bipolar current pulse is illustrated since that is all that is necessary for an understanding of this technique. When the stress wave is at a position in the magnetic head indicated by pulse 54 in waveform A, the positive polarity current pulse causes a width of the recording medium to be magnetized in the positive direction in the same manner as was accomplished in FIG. 4. However, the negative polarity current pulse is applied to the transducer coil at a time when the stress wave has moved only a short distance, such as indicated by pulse 55 of waveform A. The coincidence of the negative current pulse and the slightly displaced stress wave causes a reversal of polarity of the magnetic medium thus reverting a large portion of the previously recorded bit back to the normal state of magnetization. The small portion on the magnetic medium which is not reverted back to its original state depends upon the distance of travel of the stress wave between the positive and negative portions of the bipolar current pulse.

The description above relates to discrete pulse recording where "1" bits are represented by magnetized spots different from the general magnetization of the medium and "0's" are not recorded. It is possible that non-return to zero recording could be used as well. In such a case, the non-return to zero waveform would extend across the width of the tape rather than along the length of the tape as is conventional in the prior art. Such a recording would, of course, have to be read by a transversely moving head (such as is used in video recorders), or with a head using the moving stress wave concept here taught. It will be apparent to those skilled in the art that the head 12 may be used for reading the information recorded in accordance with this invention, by using the transversely moving stress wave to control the permeability of the head in such a manner that only the localized area undergoing stress has sufficient permeability to sense recorded information. The stress wave thus "scans" transversely along the gap 14.

While the invention has been particularly shown and described with reference to preferred embodiments thereof, it will be understood by those having ordinary skill in the art that the foregoing and changes in form and details may be made therein without departing from the spirit and scope of the invention.

What is claimed is:

1. A magneto-acoustic transducer for recording data bits on a magnetic medium comprising:
   (a) a magnetostrictive transducer defining an air gap therein, said magnetostrictive transducer being in proximity to said magnetic recording medium, and said air gap extending over a width of said medium covering several tracks on said medium,
   (b) a pair of electrode plates and an ultrasonic transducer sandwiched between said plates forming an ultrasonic assembly,
   (c) said assembly being bonded to said magnetostrictive transducer at one end thereof,
   (d) an ultrasonic generator for energizing said ultrasonic transducer periodically,
   (e) a coil wound on said magnetostrictive transducer, and
   (f) means for applying two-phase bipolar current pulses representing data bits to said coil in between the periods of ultrasonic transducer energization whereby each two-phase bipolar current pulse in said period coincides in time with said stress wave at a different location in said magnetostrictive transducer.

2. A magneto-acoustic transducer as claimed in claim 1 further comprising means for applying a reset magnetomotive force to said magnetostrictive transducer.

3. A method of recording a bit of information on a particular location of a magnetic recording medium comprising the steps of:
   (a) initiating a stress wave at one end of a normally unstressed magnetostrictive write head by pulsing an ultrasonic transducer which is bonded at said one end of said write head, and
   (b) inducing a magnetostrictive force in said write head sufficient to cause writing of a bit in coincidence with said stress wave being at a location in said write head which is closest to said particular location by applying a two-phase bipolar current pulse to a coil wound on said write head.

References Cited

UNITED STATES PATENTS

| | | | |
|---|---|---|---|
| 2,921,989 | 1/1960 | Serrell | 179—100.2 |
| 3,053,941 | 9/1962 | Johnson | 179—100.2 |

OTHER REFERENCES

Rajchman, "Computer Memories, a Survey of the State-of-the-Art," Proceedings of the IRE, January 1961, p. 110.

BERNARD KONICK, Primary Examiner
W. F. WHITE, Assistant Examiner

U.S. Cl. X.R.

179—100.2; 340—174.1